United States Patent [19]

Maekawa et al.

[11] Patent Number: 5,121,272
[45] Date of Patent: * Jun. 9, 1992

[54] APPARATUS FOR CENTERING THE MAGNETIC DISC IN A MAGNETIC DISC DRIVE

[75] Inventors: Nobuyoshi Maekawa; Hideya Yokouchi; Tomoe Aruga; Tadashi Sugiyama, all of Suwa, Japan

[73] Assignee: Seiko Epson Corporation, Tokyo, Japan

[*] Notice: The portion of the term of this patent subsequent to Apr. 25, 2006 has been disclaimed.

[21] Appl. No.: 404,936

[22] Filed: Sep. 8, 1989

Related U.S. Application Data

[63] Continuation of Ser. No. 316,718, Feb. 28, 1989, Pat. No. 4,903,155, which is a continuation of Ser. No. 161,362, Feb. 22, 1988, Pat. No. 4,825,314, which is a continuation of Ser. No. 746,095, Jun. 18, 1985, abandoned.

[30] Foreign Application Priority Data

Jun. 22, 1984 [JP] Japan ............................. 59-128955

[51] Int. Cl.⁵ ........................................... G11B 17/028
[52] U.S. Cl. ................. 360/99.08; 360/99.12; 360/99.04; 360/99.05
[58] Field of Search ............... 360/99.08, 99.04, 99.12, 360/99.05

[56] References Cited

U.S. PATENT DOCUMENTS

| | | | |
|---|---|---|---|
| 4,152,740 | 5/1979 | Stratton | 360/133 |
| 4,445,155 | 4/1984 | Takahashi et al. | 360/99.04 |
| 4,445,157 | 4/1984 | Takahashi | 360/133 |
| 4,517,617 | 5/1985 | Tsusi et al. | 360/133 |
| 4,613,921 | 9/1986 | Holmes | 360/99.04 |
| 4,672,486 | 6/1987 | Bettini | 360/97 |
| 4,697,216 | 9/1987 | Tsukahara | 360/97 |
| 4,825,314 | 4/1989 | Maekawa et al. | 360/99.08 |
| 4,903,155 | 2/1990 | Maekawa et al. | 360/99.08 |

FOREIGN PATENT DOCUMENTS

| | | | |
|---|---|---|---|
| 58-102071 | 7/1983 | Japan . | |
| 59-54089 | 3/1984 | Japan | 369/270 |
| 60-136944 | 7/1985 | Japan . | |

*Primary Examiner*—Robert S. Tupper
*Attorney, Agent, or Firm*—Blum Kaplan

[57] ABSTRACT

A disc drive for a disc including a disc rotating apparatus comprising a rotating shaft for being received within a first aperture of the disc. A spindle is affixed to the shaft. The spindle has a surface disposed in a plane perpendicular to the shaft, for supporting the disc. A disc driving means includes a position controlling member received in a second aperture of the disc, a rigid member for controlling the position of the position controlling member, and a biasing member for urging the rigid member in at least one direction so that the position controlling member engages the disc. A centering force to center the disc on the disc rotating apparatus is produced due to the action of the position controlling member on the disc. The biasing member may be configured so as to act upon the rigid member in an additional direction to produce an additional centering force component when the position controlling member engages the disc, thus urging sides of the first aperture of the disc against the rotating shaft. The rigid member has a first portion pivotally attached to the disc rotating means at a point removed from the rotating shaft and a second portion for supporting the position controlling member. The second portion of the position controlling member is configured to support the position controlling member so that it is angled forward with respect to the direction of rotation of the disc, to aid in holding the disc firmly on the spindle.

19 Claims, 10 Drawing Sheets

FIG. 11
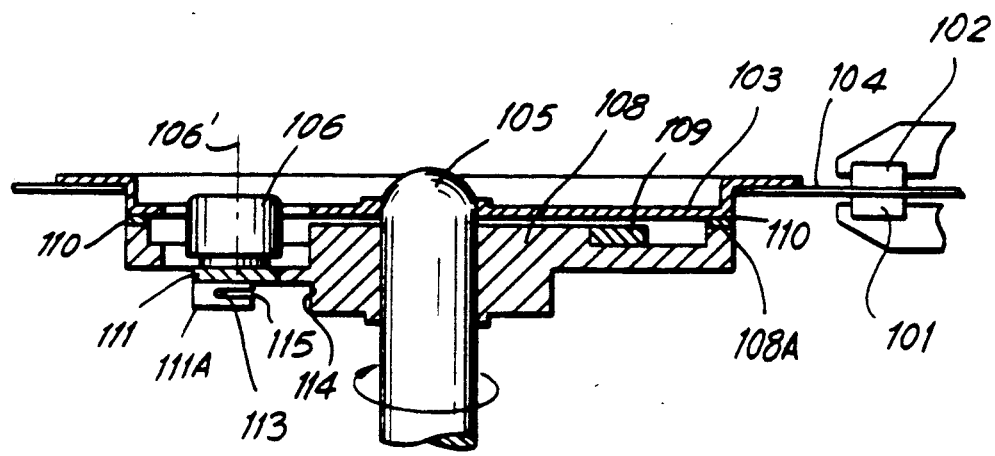
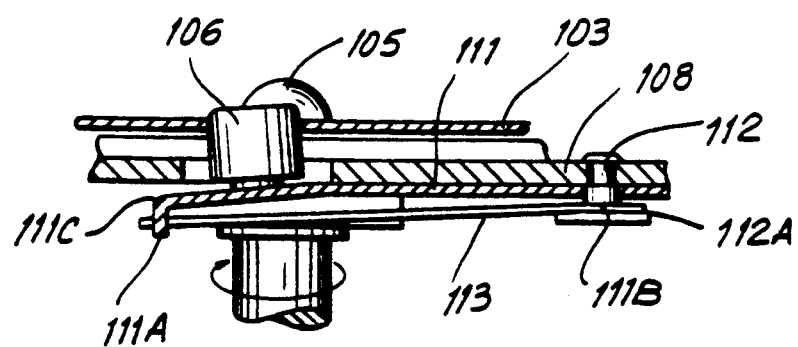
FIG. 12

FIG. 13
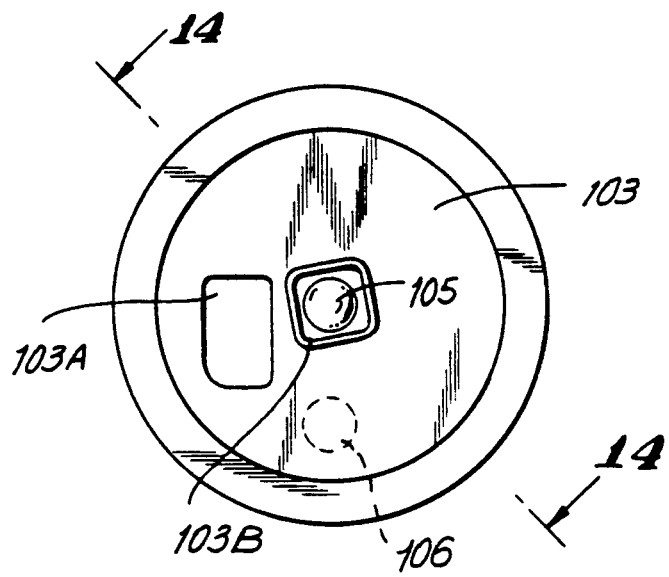
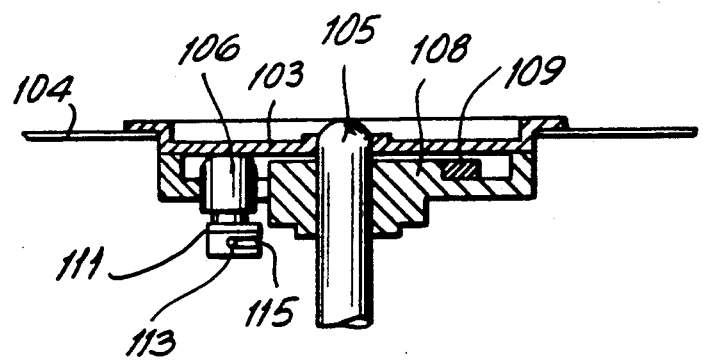
FIG. 14

APPARATUS FOR CENTERING THE MAGNETIC DISC IN A MAGNETIC DISC DRIVE

This is a continuation of U.S. patent application Ser. No. 07/316,718 filed on Feb. 28, 1989 now U.S. Pat. No. 4,903,155 which is a continuation of 07/161,362, filed on Feb. 22, 1988 now U.S. Pat. No. 4,825,314 which is a continuation of U.S. patent application Ser. No. 06/746,095 filed Jun. 18, 1985 now abandoned.

BACKGROUND OF THE INVENTION

The present invention is generally directed to disc drives and in particular to apparatus for centering magnetic discs in magnetic disc drives.

There are conventional disc drives which are designed to center and rotate a disc having a hub which has a first substantially square centrally located aperture and a second aperture located at a point on the hub removed from the center. The centrally located aperture receives a cylindrical motor shaft while the second aperture receives a position controlling member which provides a rotational force and a centering force to the disc. This centering force urges two walls of the central aperture into contact with the motor shaft.

In this type of conventional system the position controlling member is a driving roller. The driving roller is supported by a spring plate which is affixed to a spindle that rotates with the motor shaft and supports the disc.

In this arrangement, the positioning of the driving roller is affected by how accurately the driving roller is positioned on the spring plate, how accurately the elasticity of the spring plate is reproduced from unit to unit and the manner in which the spring plate is positioned with respect to the spindle. Therefore, the rotational and centering forces that the roller exerts on the disc vary with the positioning of the driving roller.

Since the spring plate supports the driving roller, there are a limited number of configurations for the spring plate. Generally the spring plate must be of at least a certain minimum size in order to obtain appropriate elasticity.

Another disadvantage of this conventional structure is that when the disc rotates the driving roller is subject to a force equal and opposite to the force transmitted to the rotating disc. The spring plate is deformed until this force balances with the force of restitution of the spring plate. Since the spring plate is generally designed to flex so as to allow motion of the roller both in a direction which is perpendicular to that of the plane of the spindle and in a direction which is perpendicular to the longitudinal axis of the motor shaft, the driving roller is forced to incline backwards with respect to the direction of rotation of the disc as the spring plate is flexed.

An additional force on the disc which tends to oppose rotation of the disc is friction between the disc and magnetic heads which are used to read the disc. The friction varies from disc to disc, especially when the discs are produced by different manufacturers. Other factors which affect this force are the kind of disc, the location of the heads and environmental factors such as temperature and humidity. Thus, the degree of inclination of the rotational axis of the driving roller is subject to large variations. This is a defect of major significance in that the recording and reading of data by the heads will be unreliable or impossible because timing for recording and reading out the data is based on the position of the driving roller.

In such conventional disc drives, a small circular slippery sheet is generally attached to the center of the spindle. The disc hub is attracted to the spindle by a magnet on the spindle which urges the disc into contact with the slippery sheet. This arrangement causes the stability of the position of the disc with respect to the spindle to be unstable. The disc may float up and flap in the direction of the longitudinal axis of the motor shaft when the disc rotates.

Accordingly there is a need for a disc drive which has a more precise and reliable apparatus for centering and rotating the disc and produces results which are repeatable from disc to disc even under changes in environmental conditions, changes in position of the magnetic heads, and aging or deterioration of components of the centering apparatus.

SUMMARY OF THE INVENTION

Generally speaking, this invention is directed to a disc drive for use with a storage disc such as a magnetic disc. It finds application in disc drives for discs having a hub with a centrally located square aperture and a second aperture for receiving a position controlling member at a location removed from the center of the hub.

The disc drive of the present invention has a disc rotating apparatus comprising a rotating shaft which is received within a first aperture of the disc. A spindle is affixed to the shaft. The spindle has a surface disposed in a plane perpendicular to a longitudinal axis of the shaft. This surface supports the disc. Urging means such as a magnet is provided for urging the disc into contact with the surface. A driving means associated with the spindle includes a position controlling member, such as a roller for being received within the second aperture, a control element for supporting the position controlling member and a separate biasing element for biasing the control element in at least one direction so that the position controlling member engages the disc.

A centering force is produced due to the action of the position controlling member on the disc. The biasing element ay be configured so as to act upon the control element to produce an additional centering force component when the position controlling member engages the disc.

The control element and the biasing element may be sized, shaped and positioned so that the centering force is proportional to any forces acting on the disc which oppose rotation of the disc.

The control element may be a rigid member pivotally attached to the disc rotating means, or preferably the spindle means thereof, at a point removed from the rotating shaft. A first portion of this rigid member may be pivotally attached to the disc rotating means or spindle means while a second portion supports the position controlling member so that it is forwardly inclined with respect to the direction of rotation of the disc.

The biasing element may be configured to urge the rigid member to move in a direction with respect to the rotating means so that the position controlling member provides the centering force for the disc by urging sides of the first aperture against the rotating shaft.

The biasing element is sized, shaped and positioned so that the position controlling member is first received in the second aperture, upon relative rotation of the spindle means with respect to the rotating body in a position removed from a wall of the second aperture. Upon further relative rotation of the spindle means with respect to the rotating body the position controlling means contacts the wall. The biasing element thus applies the centering force to the disc.

The disc drive of the invention may be used with a disc in which the second aperture has a radially outwardly located all and in which the radial distance of the wall from the rotating shaft decreases in a direction corresponding to the rotating direction of the disc.

According to the invention, the biasing element urges the position controlling member against a lower surface of the rotating body of the disc when the relative positions of the spindle means and the rotating body are such that the position controlling member contacts a part of the lower surface of the disc removed from the second aperture.

Accordingly, it is an object of the present invention to provide an improved magnetic disc drive in which aberration in the timing of the recording on and reading out of data from the disc are completely eliminated.

Another object of the present invention is to provide an improved magnetic disc drive which permits stable rotation of the disc and eliminates flapping of the disc while it rotates.

A further object of the invention is to provide structure which precisely and reliably centers the disc when the disc is rotated in the disc drive.

Yet another object of the invention is to provide a structure which reproducibly positions various discs even if they are produced by different manufacturers or are used with recording heads which are in different positions.

Still another object of the invention is to provide a disc drive with a centering apparatus which is conducive to being manufactured in small sizes and at reduced cost.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTIONS OF THE DRAWINGS

For a fuller understanding of the invention, references is had to the following description taken in connection with the accompanying drawings, in which:

FIG. 11 is a sectional view taken generally along line 11—11 of FIG. 10;

FIG. 12 is a partial sectional view taken generally along line 12—12 of FIG. 10;

FIG. 13 is a plan view which represents the initial placement of the disc on the disc drive of FIG. 10;

FIG. 14 is a sectional view taken generally along line 14—14 of FIG. 13;

DETAILED DESCRIPTION OF THE PREFERRED EMBODIMENTS

In order to more fully appreciate the description of the invention, reference will first be made to FIGS. 1 through 9 which illustrate a conventional disc drive according to the prior art.

A typical conventional magnetic disc drive for a disc having a central rigid rotating body and a outer annular portion upon which information is stored is shown, for example, in Japanese Utility Model Application, Laid Open Publication No. 83/102071.

Figure 1:
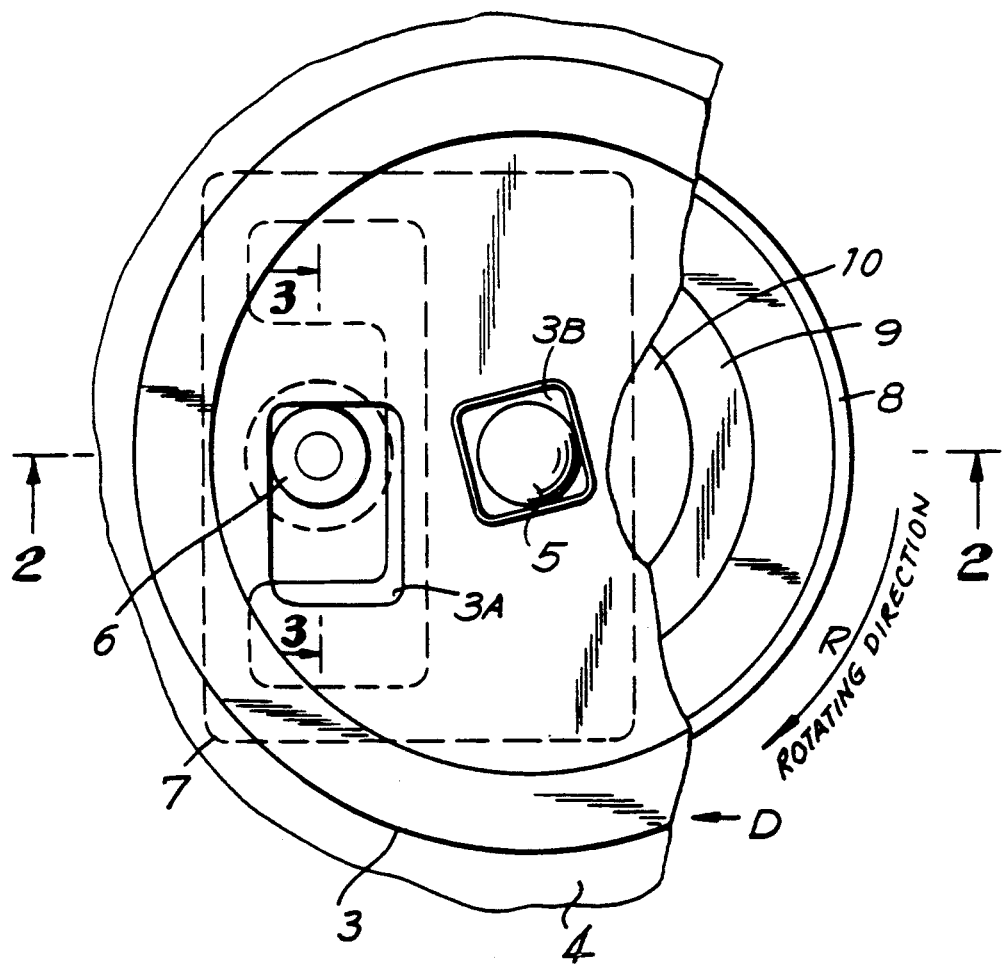
FIG. 1 is a plan view of a conventional magnetic disc drive with a disc mounted thereon, the disc being partially cut away.
Figure 2:
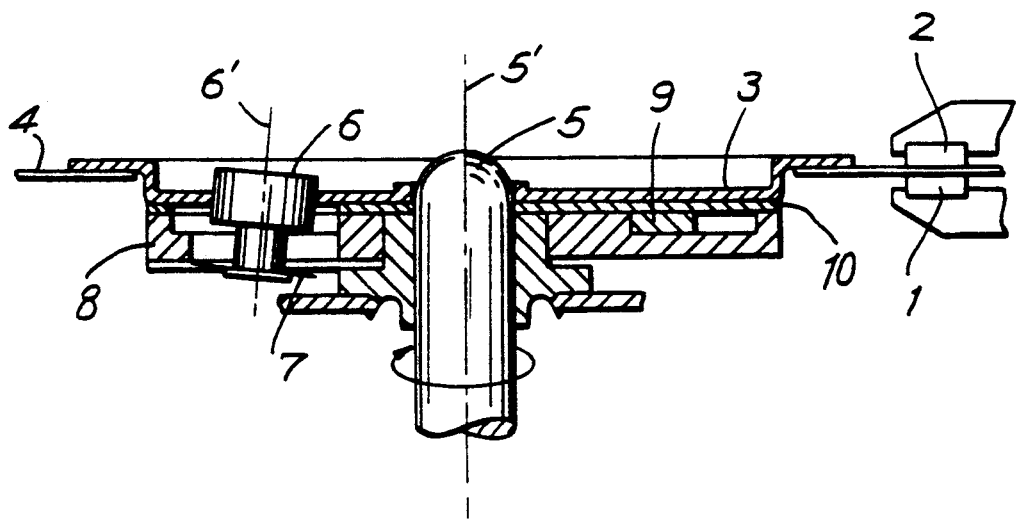
FIG. 2 is a sectional view of the system of FIG. 1 taken generally along line 2—2 of FIG. 1.

As shown with reference to FIGS. 1 and 2, the disc shown generally at D, includes a center hub 3 and an annular portion 4 for storing information. The annular portion 4 may be integral with the hub 3. The hub 3 is preferably formed of magnetic material. The hub 3 has formed therein a substantially square aperture 3B for receiving the motor shaft of the disc drive and a second aperture 3A for inserting a driving roller which causes the disc to rotate.

The disc drive includes a motor shaft 5 which is received within aperture 3B. Motor shaft 5 rotates around its own longitudinal axis 5′, which is perpendicular to the plane of disc D. The direction of rotation is as shown by the arrow R in FIG. 1. Driving roller 6 provides driving and centering forces disc D. Roller 6 is resiliently supported by a spring plate which can bend at right angles with respect to the plane of the center hub 3 and longitudinal axis 5′ of motor shaft 5. Spring plate 7 is fixed to a spindle hub 8 which is fixedly connected to motor shaft 5 and may be integrally formed therewith.

Figure 4:
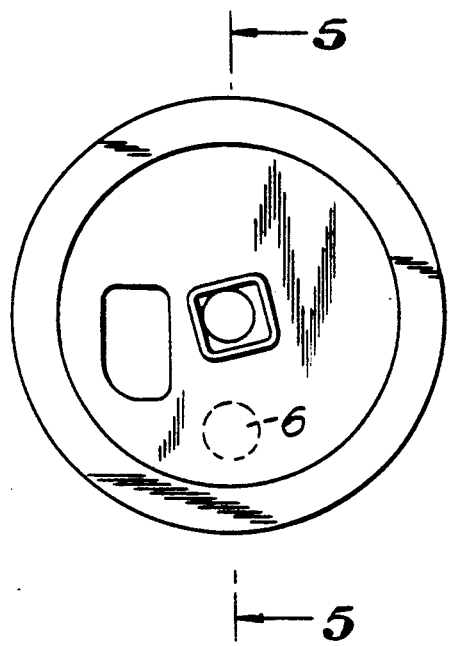
FIG. 4 is a plan view which represents the initial placement of the disc on the conventional disc drive of FIG. 5—5 of FIG. 4.
Figure 5:
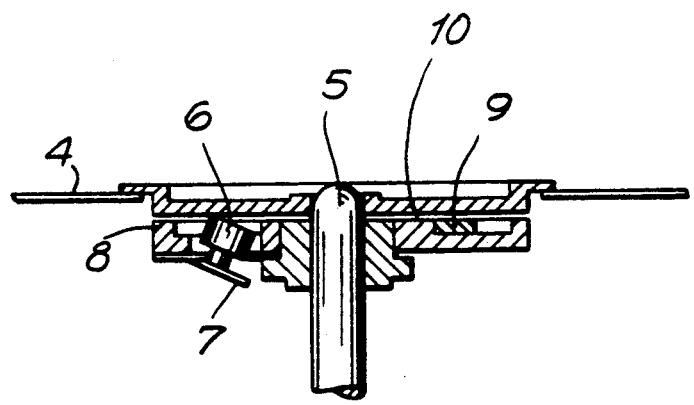

When disc D is inserted into the disc drive, the center hub 3 is attracted by a magnet 9 attached to the spindle hub 8 and forcibly contacts the surface of a slippery sheet 10 affixed to a portion of the upper surface of spindle hub 8. As this occurs, the motor shaft 5 is inserted into aperture 3B of center hub 3. If the locations of aperture 3A and driving roller 6 do not coincide, the spring plate 7 is caused to flex due to the force of the center hub 3 on roller 6 as shown in FIGS. 4 and 5. This force is due to the attraction of center hub 3 by magnet 9.

Figure 6:
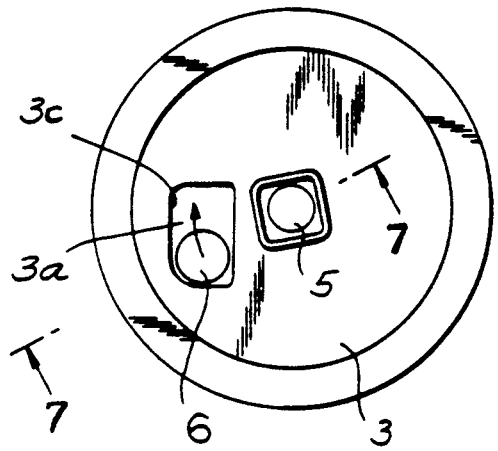
FIG. 6 is a plan view showing the driving roller inserted in the aperture of the disc hub in the conventional system of FIG. 1.
Figure 7:
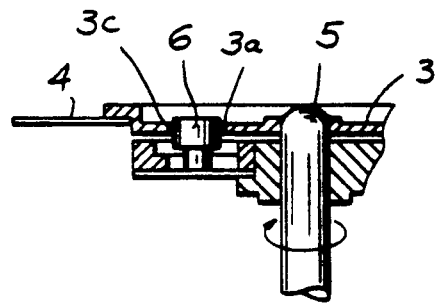
FIG. 7 is a partial sectional view taken generally along line 7—7 of FIG. 6.

As shown in FIGS. 6 and 7 when motor shaft 5 rotates in the direction shown by arrow R, spindle hub 8, fixedly connected to motor shaft 5 rotates with respect to center hub 3 of disc D. During this portion of the relative rotation of the spindle hub 8 with respect to center hub 3 disc D is prevented from rotating due to the frictional forces of magnetic heads 1 and 2 upon annular portion 4 of disc D.

Figure 8:
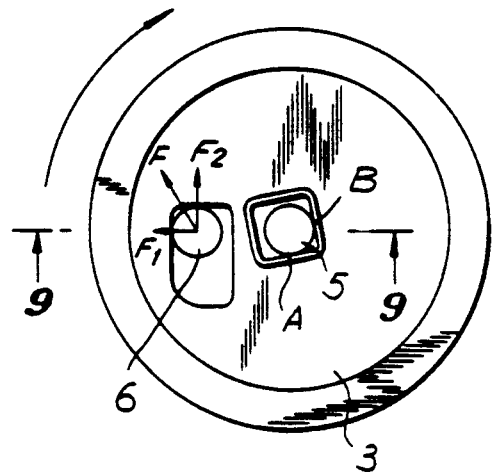
FIG. 8 is a plan view showing the driving roller in the position where it starts to transmit rotational force to the disc in the conventional system of FIG. 1.
Figure 9:
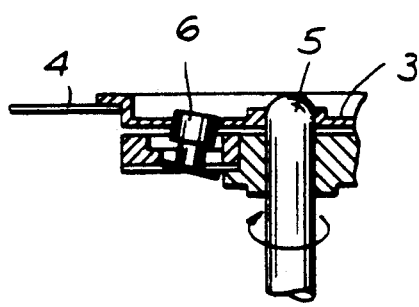
FIG. 9 is a partial sectional view taken generally along line 9—9 of FIG. 8.

As spindle hub 8 continues to rotate with respect to center hub 3, roller 6 arrives at aperture 3A. At this time, the force of restitution of spring plate 7 pushes roller 6 into aperture 3A. As relative rotation between spindle hub 8 and center hub 3 continues, roller 6 rolls into contact with the outer side wall 3C of aperture 3A as shown in FIGS. 8 and 9. The rotating power of motor shaft 5 is thus transmitted to center hub 3 through roller 6 and the disc D begins to rotate along with motor shaft 5. When this occurs, disc D is subjected to centering force $F_1$ which urges center hub 3 against motor shaft 5 and the restoring force $F_2$ caused by the friction between the annular portion 4 of disc D and the heads 1 and 2. Equal and opposite forces due to deformation of spring plate 7 act on roller 6 as soon a state of relative equilibrium is established.

As shown in FIG. 8, resultant force F of centering force $F_1$ and rotating force $F_2$ causes center hub 3 to rotate in the direction of arrow R in accordance with the rotation of motor shaft 5. In addition, force F causes two sides of aperture 3B to be urged into contact with motor shaft 5 at points A and B thus maintaining disc D in a coaxial relationship with respect to motor shaft 5.

As noted above, in this conventional system, roller 6 is supported and is biased in a direction at right angles to both the plane of spindle hub 8 and the longitudinal axis of motor shaft 5 by spring plate 7 as shown in FIGS. 1 and 2. In other words, longitudinal axis 6', about which roller 6 rotates, is caused to incline in two directions due to forces of disc 1 upon roller 6. One direction is that which is opposite to the direction of, rotation of disc 1. The other direction is towards longitudinal axis 5' of motor shaft 5.

As noted above, positioning of roller 6 is affected by how accurately driving roller 6 is positioned on the spring plate 7, how accurately the elasticity of spring plate 7 is reproduced from unit to unit and how accurately spring plate 7 is positioned with respect to spindle hub 8. The displacement of roller 6 is therefore not precise and centering force F in FIGS. 8 and 9 is not necessarily constant for a given position of roller 6.

In view of the fact that spring plate 7 must support roller 6, the possible configurations of spring plate 7 are limited. Thus, spring plate 7 is required to be at least of some minimum size in order to obtain appropriate elasticity characteristics. It is therefore not possible to reduce the size of the structure to any great degree.

As also noted above, driving roller 6 is subjected to a force equal and opposite to the force which causes rotation of disc D. This force must be balanced by a restitutional force created by the elasticity of spring plate 7. Spring plate 7 is thus caused to flex and driving roller 6 inclines backward with respect to the direction of rotation of disc D.

As also noted above, frictional forces between the annular portion 4 of disc D and heads 1 and 2 also generate forces upon roller 6. These latter forces depend on the surface characteristics of the disc, which may vary from manufacturer to manufacturer and the location of heads 1 and 2. Further variation is caused by environmental factors such as temperature and humidity. Thus, the degree of inclination of driving roller 6 is subject to substantial variations. These variations are absolutely fatal to successful recording and reading of information on disc D since the centering is affected and timing for recording is based on the position of roller 6.

Figure 3:
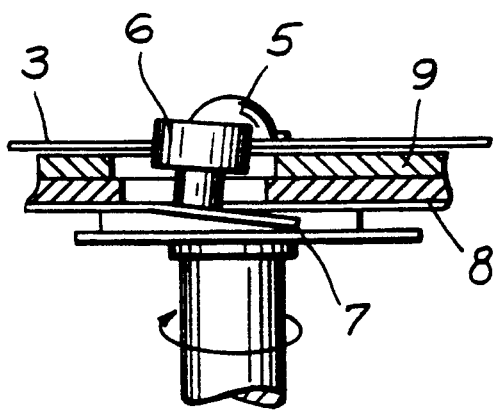
FIG. 3 is a partial sectional view taken along line 3—3 of FIG. 1.

In the conventional structure illustrated in FIGS. 1 through 3, a sheet having a surface with a low coefficient of friction or commonly called a slippery sheet 10 is attached to the center portion of spindle hub 8. While center hub 3 is attracted by magnet 9 affixed to spindle 8, this arrangement results in instability in the positioning of center hub 3. This causes the disc to float up and flap in the vertical direction or in a direction generally parallel to longitudinal axis 5' of motor shaft 5.

In order to now describe the present invention reference will be made to FIGS. 10 through 20 wherein parts similar to those in the conventional system are referred to by similar numbers.

Figure 10:
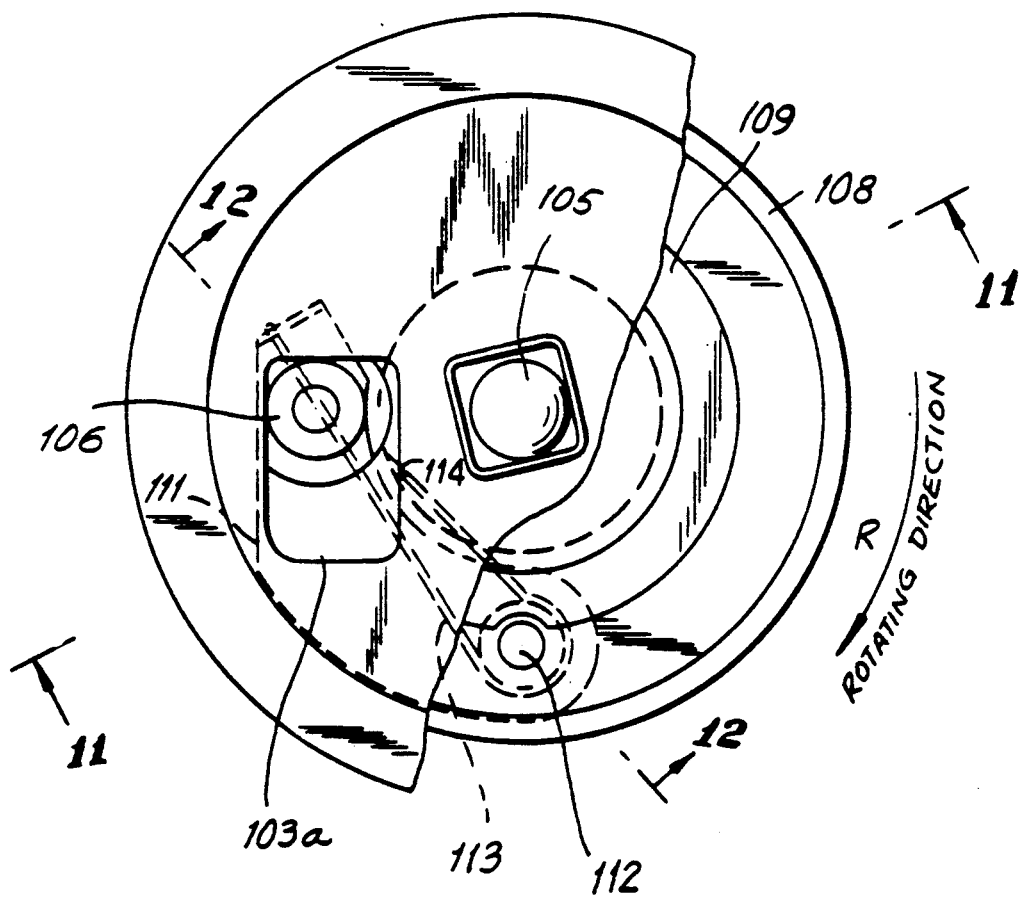
FIG. 10 is a plan view, of a first embodiment of the present invention with a disc mounted thereon, the disc being partially broken away.

In FIGS. 10 and 11 motor shaft 5 causes spindle hub 108 to rotate. Driving roller 106 is supported by lever 111. A ligament spring 113 is received in an opening, bore or notch 114 in spindle hub 108. Ligament spring 113 is shaped to curve around a pivot pin 112 which pivotally couples lever 111 to spindle 108. Spring 113 is shaped so that it is supported by a circumferential portion of upper planar surface 112A of pin 112. Spring 113 further extends into an opening, hole or notch 115 in vertical portion 111A of lever 111.

Lever 111 has a first portion 111B which extends generally parallel to spindle 108. This portion has an opening for pin 112. A second portion 111C of lever 111 is inclined at an angle with respect to the plane of spindle 108. Roller 106 is mounted on portion 111C. By use of a suitable bearing (not shown), of a type well known in the art, roller 106 is mounted so that it can rotate about an axis 106' which is perpendicular to the plane of the second portion of lever 111. Pin 112 is sized so that the first portion of lever 111 is not held tightly against spindle 108. Pin 112 and the hole in lever 111 through which pin 112 extends are sized so that lever 111 can pivot slightly in the vertical direction as well as in the plane of spindle 108.

In view of one end of ligament spring 113 being secured to spindle hub 108 and the other end being engaged with vertical portion 111A of lever 111, driving roller 106 is movable in a direction perpendicular to the plane of spindle hub 108 and in a direction parallel to the plane of spindle hub 108. When motion of roller 106 in a direction perpendicular to the plane of spindle hub 108 occurs, torsional forces are generated by ligament spring 113 tending to bias roller 106 toward its position as illustrated in FIG. 12. When a force having a direction in the plane of spindle 108 and radially inward toward motor shaft 105 is exerted on roller 106, spring 113 is compressed; that is it is wound more tightly with reference to the part of spring 113 that is contact with upper annular plane 112A of pin 112.

An annularly shaped member 110 similar to slippery sheet 10 may be disposed between the surface of the circumferentially outer most, raised, annular portion 108A of spindle 108 and the lower surface of hub 103. However, member 110 is shown only in FIG. 11, it being understood that it is possible to omit member 110 if the surface of portion 108A is itself "slippery".

With reference to FIGS. 13 and 14 when a disc D is first inserted into the disc drive, roller 106 may not be in a position where it can be received within aperture 103A. Center hub 103 of disc D, formed at least partially of a magnetic material, is attracted by peripheral portion 108A of spindle hub 108 due to the action of magnet 109. Magnet 109 is affixed to spindle 108 at a position radially inward with respect to the region of contact of center hub 103 and spindle hub 108. Further, it is sized, shaped and positioned so that an air gap exists between the upper surface of magnet 109 and the lower surface of center hub 103. Thus, a magnetic circuit is created which includes magnet 109, a portion of spindle hub 108, center hub 103 and the air gap.

When the aperture 103 and roller 106 are in the relative positions shown in FIG. 13 the lower plane surface of hub 103 forces roller 106 downward from its normal position shown in FIG. 12 to the position shown in FIG. 14. This causes a torsional deformation of spring 113 which provides a restoring force tending to urge roller 106 upward toward the position shown in FIG. 12.

As motor shaft 105 begins to rotate, spindle hub 108 rotates relative to center hub 103 of disc D. Disc D is prevented from rotating as a result of being held between heads 101 and 102 as shown in FIG. 11.

Figure 15:
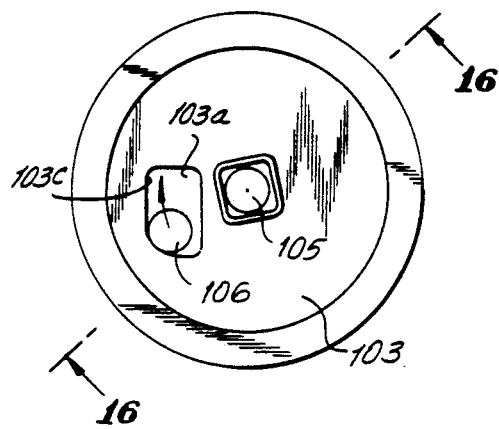
FIG. 15 is a plan view showing the driving roller inserted in the aperture of the disc hub in the system of FIG. 10.
Figure 16:
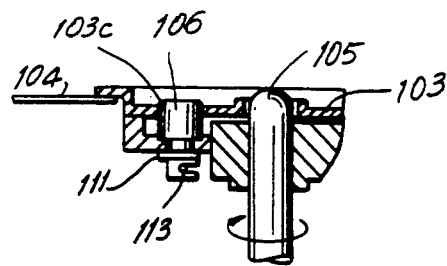
FIG. 16 is a partial sectional view taken generally along line 16—16 of FIG. 15.
Figure 18:
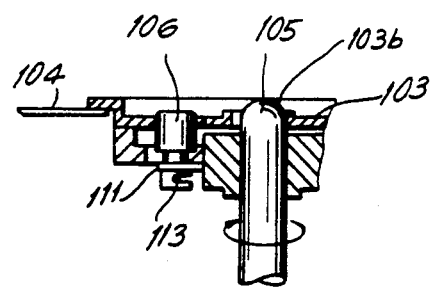
FIG. 18 is a partial sectional view taken generally along 18—18 of FIG. 17.

As spindle hub 108 continues to rotate and disc D is prevented from rotating due to frictional forces from heads 1 and 2 roller 106 arrives at aperture 103. As illustrated in FIGS. 15 and 16 roller 106 and lever 111 are caused to spring up vertically and roller 106 moves into aperture 103A due to the torsional restitution power of ligament spring 113.

Roller 106, upon being displaced upwardly into aperture 103 is not initially in contact with outer side wall 103C of aperture 103A. However, the radial distance of outer side wall 103C from the center of disc D decreases in the direction of rotation of the spindle hub 108. Roller 106 therefore rolls into contact with outer side wall 103, thus causing roller 106 to move radially inward. Lever 111 therefore rotates around pin 112 against the compressional restoring force of ligament spring 113 It eventually arrives at the position shown in FIGS. 17 and 18 where it contacts a second wall 103D of aperture 103A which may be perpendicular to wall 103C. This causes disc D to then rotate with motor shaft 105.

Figure 17:
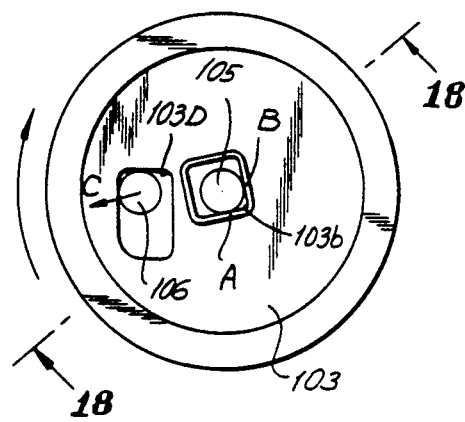
FIG. 17 is a plan view showing the driving roller in the position where it start to transmit rotational force to the disc in the system of FIG. 10.

When disc D is rotated in this manner, roller 106 produces a force on disc D. The direction of this force is represented by arrow C in FIG. 17. The direction and magnitude of this force are due to the elasticity of ligament spring 113 and the force exterted by roller 106 to rotate disc 104. Thus, as shown in FIG. 17 center hub 103 is biased so that two sides of aperture 103B are in contact with motor 105 at points A an B. The centers of the center hub 103 and motor shaft 105 are therefore aligned so that the centers of disc 104 and motor shaft 105 are coaxial.

Figure 19:
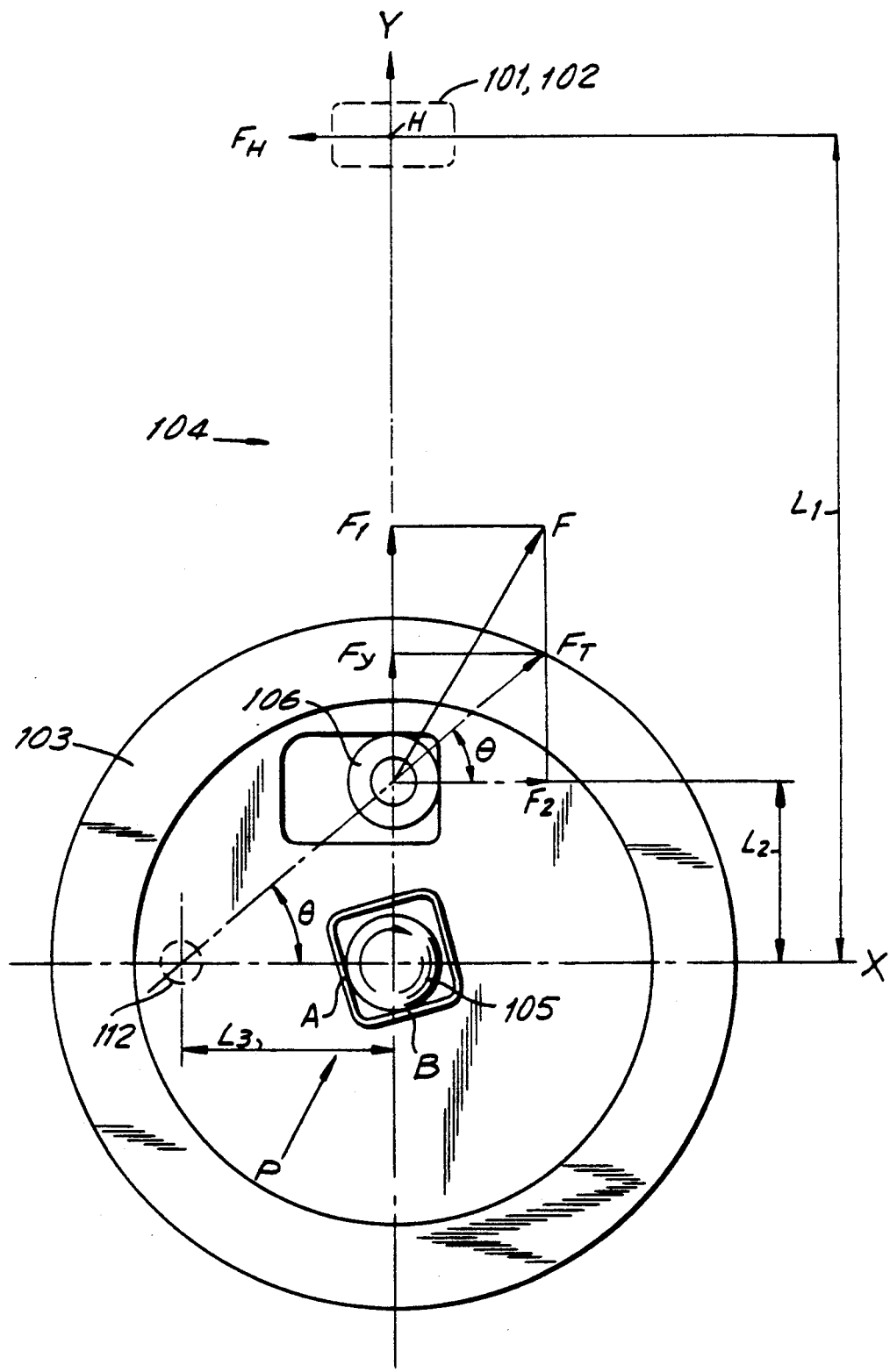
FIG. 19 is a diagram showing the various forces acting upon the disc as a result of the action of the drive roller.

The forces acting on rotating disc D are illustrated in FIG. 19. H is the position of the heads 101 and 102. $F_H$ is the frictional force generated by contact of the heads 101 and 102 with annular portion 104 of disc D which occurs at point H. $F_H$ is in a direction opposite to the direction of rotation of the disc. $L_1$ is the distance between point H and the axis of rotation of motor shaft 105. $L_2$ is the distance between the axis of roller 106 and the axis of motor shaft 105. $L_3$ is the distance between the axis of pin 112 and the axis of motor shaft 105. The angle formed by a line connecting the axis of roller 106 and the axis of pin 112 and another line connecting the axis of pin 112 and the axis of motor shaft 105 is designated as $\theta$. The force of the roller tending to cause rotation of the disc is represented by $F_2$.

If forces tending to cause rotation of the disc and their corresponding moments are considered, it is apparent that:

$$F_2 \cdot L_2 = F_H \cdot L_1$$

$$F_2 = F_H \cdot (L_1/L_2) \tag{1}$$

Forces acting upon driving roller 106 in the Y direction include a component $F_1$ of the force of the compressional elasticity of ligament spring 113 and a component $F_Y$ due to $F_2$. $F_Y$ is the component of force produced in the Y direction, with respect to pin 112 as the center of rotation, when the disc D is rotated clockwise by force $F_2$. $F_T$ is the resultant force of $F_Y$ and $F_2$.

It will be recognized that the actual force $F_S$ (not shown) due to the elasticity of ligament spring 113 acts in a direction perpendicular to the line between pin 112 and driving roller 106. Since $F_1$ is the component of $F_S$ in the Y direction:

$$F_1 = F_S / \cos \theta$$

Therefore, with $\theta$ constant, $F_1$ is directly proportional to $F_S$.

If force $F_1$ in FIG. 19 is temporarily ignored, the following equality exists with respect to the moments at pin 112:

$$F_2 \cdot L_2 = F_Y \cdot L_3 \text{ or}$$

$$F_Y = F_2 \cdot (L_2/L_3) \tag{2}$$

By substituting equation 1 in equation 2 the following relationship is obtained:

$$F_Y = F_H \cdot (L_1/L_3) \tag{3}$$

Thus, $F_Y$, the force in the Y direction which is partially responsible for centering of disc D is a function of $F_H$ and $L_1$ as shown in equation 3. Resultant force $F_T$ of $F_2$ and $F_Y$ always exist and has an orientation with respect to the X direction of angle $\theta$ which is substantially constant. Thus, the magnitude of $F_Y$ is proportional to $F_H$.

Force $F_1$, the component of the restitution force of the ligament spring 113 in the Y direction is added to force $F_T$ to produce a resultant force F which is ultimately the centering force produced by the present invention as embodied in FIG. 10.

In FIG. 19 the ideal direction of a centering force for urging center hub 103 into contact with motor shaft 105 at points A and B is shown by arrow P. It will become apparent that by appropriate positioning of pin 112 the direction of resultant force F can be made to be approximately the same as the ideal direction of the centering force as represented by arrow P.

In accordance with the present invention, and as may be fully appreciated by reference to FIGS. 11 and 12, since lever 111 is rigid, deformation of lever 111 due to forces from disc D do not occur. Thus, roller 106 is precisely, reliably and reproducibly positioned to transmit rotational forces of motor shaft 105 to center hub 103.

In addition since lever 111 is configured so that a portion thereof supports roller 106 so that roller 106 inclines forward with respect to the direction of rotation of motor shaft 105, center hub 103 is urged downward into intimate contact with the surface of portion 108A of spindle hub 108. Thus, center hub 103 is prevented from flapping in a direction perpendicular to the plane of spindle hub 108 when disc D is rotated.

The structure of the invention, including roller 106 supported by rigid lever 111 which is connected to spindle hub 108 by means of pin 112 assures a secure association of spindle hub 108 with center hub 103 of disc D. It also eliminates the effects of fluctuation of frictional force $F_H$ produced by heads 101 and 102. Finally, this structure is not subject to inaccuracies due to changes in the elastic characteristics of ligament spring 113 due to aging or degeneration.

Thus, variations in the rotational progress of disc D are avoided even if frictional force $F_H$ is not constant. Further, floating and flapping of the disc with respect to spindle 108 does not occur. Therefore, the reliability of recording and reading of data on the disc is remarkably enhanced.

Figure 20:
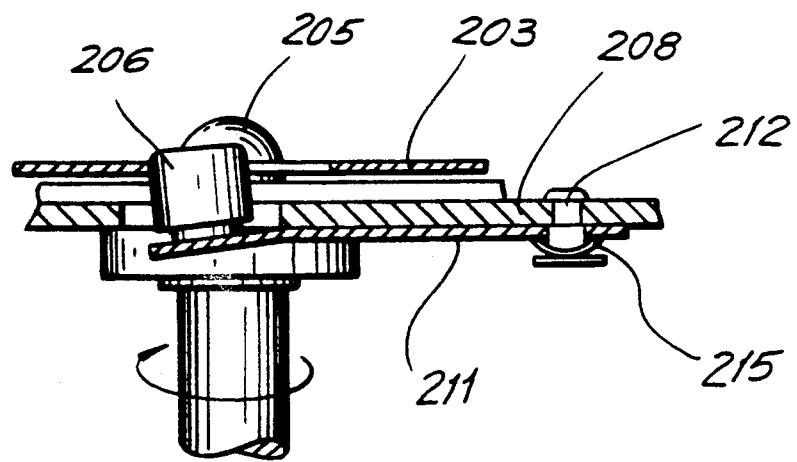
FIG. 20 is a partial sectional view of a second embodiment of the invention.

Another embodiment of the invention is illustrated in FIG. 20. The structure and operation of the embodiment illustrated in FIG. 20 is similar to that of the embodiment illustrated in FIG. 10 and described above. However, it departs from the structure illustrated in FIG. 10 in that a saucer spring 215 supported by pin 212 is used to provide a restitutional force to lever 211 which urges roller 206 into an aperture 203A corresponding to aperture 103A in FIG. 10. The force acting on the disc in a direction perpendicular to motor shaft 205 is $F_Y$ which is proportional to $F_H$, the frictional force of the heads upon the peripheral portion 104 of the disc D.

In this second embodiment of the invention resultant force $F_T$ of $F_Y$ and $F_2$ also cause centering of center hub 203. A force corresponding to force $F_1$ is not produced. However, the advantages of the present invention may be exploited with further reduced manufacturing costs and simplified assembly by use of this second embodiment of the invention.

Thus, it is apparent from reading the above description that using a first element, (levers 113 or 213) to control position of the roller and a second separate or independent element (ligament spring 113 or saucer spring 215) to provide forces for biasing the roller into its proper operating position stabilizes the rotation of the magnetic disc even if the frictional forces between the magnetic disc and the heads are not constant. This stabilizes the timing essential for accurate recording and reading of the data on the disc.

It will also be apparent that since the spindle hub supports the center hub of the disc at its peripheral portion, flapping of the magnetic disc is controlled. Further, shaping the lever which supports the roller so that the roller is inclined forward with respect to the direction of rotation of the disc assures intimate contact between the center hub and the spindle hub. This tends to further stabilize rotation of the disc.

The requirement for extreme precision in the fabrication of components which provide a restitution force to the lever is relaxed considerably as a result of having independent members which position the roller and provide the forces necessary to return the roller to its operating position.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

We claim:

1. A disc drive for a disc having a first aperture and a second aperture comprising:
   a rotating spindle shaft for being received within the first aperture of the disc;
   spindle hub means affixed to the rotating spindle shaft for supporting the disc, the spindle hub means including a magnetic material which attracts the disc towards the spindle hub means;
   rotating means for rotating the rotating spindle shaft and the spindle hub means; and
   movable lever means mounted on the spindle hub means for rotation in a plane substantially parallel to the disc surface, wherein the pivot center thereof is apart from the rotating spindle shaft;
   a pin member mounted on the movable lever means, said movable lever means allowing movement of said pin in a direction substantially perpendicular to the disk surface, said movable lever means positioning said disc utilizing a component force of the movable lever means generated when the pin member engages with said second aperture.

2. The disc drive of claim 1, wherein said movable lever means positions said disc by a force component generated in a radial direction and outward direction from said pivot center relative to said rotating shaft when the second aperture of said disc engages said pin member.

3. The disc drive of claim 2, wherein said movable lever means further comprises biasing means for urging said pin member in a direction substantially perpendicular to a lower surface of said disc.

4. The disc drive of claim 3, wherein said biasing means includes a spring member formed separately from said movable lever.

5. The disc drive of claim 2, wherein said movable lever means includes biasing means for urging said pin member in the radial direction and outward direction with respect to said rotating shaft.

6. The disc drive of claim 5, wherein said biasing means includes a spring member formed separately from said movable lever means.

7. The disc drive of claim 6, wherein said spring member provides a force for urging said pin member in a direction substantially perpendicular to a lower surface of said disc.

8. The disc drive of claim 2, wherein said pin member inclines to the forward direction relative to a direction of rotation of the disc rotating apparatus.

9. The disc drive of claim 3, wherein the urging force of said biasing means is weaker than the attracting force between said disc and the magnet material included in said spindle hub means, and said pin member is displaced by the flexure of said biasing means when contacting said pin member with the lower surface of the disc when said second aperture of said disk.

10. The disc drive of claim 5, wherein said pin member contacts an inner surface wall of the second aperture of said disc, and said disk is positioned by the urging force of said biasing means through said pin member moving with said inner surface wall relative to said rotating shaft.

11. The disc drive of claim 2, wherein said movable lever means is rotatably attached to said spindle hub means at the position of said pivot center.

12. The disc drive of claim 11, further comprising a second pin for attaching said movable lever means to said spindle hub means so that said movable lever inclines in a direction of said rotating shaft.

13. The disc drive of claim 2, wherein said movable lever means includes a first portion which extends in a direction parallel to a surface of said spindle hub means which is opposed to said disc and a second portion which extends from said first portion at a fixed angle relative to the first portion and said pin member being attached to said second portion.

14. The disc drive of claim 2, wherein said second aperture forms a wall and said movable lever means and the pin member are arranged so that upon relative rotation of the spindle hub means with respect to the disc, the pin member contacts the wall of said second aperture, whereby the pin member applies a centering force to the disc.

15. The disc drive of claim 14, wherein said wall is located radially outward relative to the rotating spindle shaft, a radial distance of the wall from the rotating spindle shaft decreasing in a direction corresponding to a direction of rotation of the disc.

16. The disc drive of claim 2, wherein the disc comprises a discoidal rigid rotating body the first aperture and the second aperture being formed in said rigid rotating body, and an annular portion upon which information is recorded, the annular portion being secured to the rotating body.

17. The disc drive of claim 2, wherein information is stored on said disc and further comprising at least one head for processing information stored on the disc as the disc rotates.

18. The disc drive of claim 17, in which the at least one head is a magnetic head.

19. The disc drive of claim 17, in which the at least one head is in contact with the planar surface of the disc and exerts a force upon the disc when the disc is rotated, the force being in a direction opposed to the direction of rotation of the disc.

* * * * *